(12) United States Patent
Saito et al.

(10) Patent No.: US 8,594,597 B2
(45) Date of Patent: Nov. 26, 2013

(54) PORTABLE TRANSMITTER POWERED BY BUTTON BATTERY

(75) Inventors: Toshiaki Saito, Kariya (JP); Mitsuru Nakagawa, Chiryu (JP); Tokio Shimura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/136,053

(22) Filed: Jul. 21, 2011

(65) Prior Publication Data

US 2012/0021705 A1   Jan. 26, 2012

(30) Foreign Application Priority Data

Jul. 23, 2010  (JP) .................................. 2010-165975

(51) Int. Cl.
 *H04B 1/034* (2006.01)
(52) U.S. Cl.
 USPC ............. 455/128; 455/90; 455/100; 455/351
(58) Field of Classification Search
 USPC ......................................................... 455/128
 See application file for complete search history.

(56) References Cited

U.S. PATENT DOCUMENTS

| | | | | |
|---|---|---|---|---|
| 4,491,970 | A | * | 1/1985 | LaWhite et al. ............... 455/100 |
| 6,515,865 | B2 | * | 2/2003 | Johnson et al. ................ 361/752 |
| 6,852,929 | B2 | * | 2/2005 | Scudder ............................ 174/66 |
| 2004/0099430 | A1 | | 5/2004 | Scudder |
| 2004/0105347 | A1 | | 6/2004 | Fujimori et al. |
| 2008/0284659 | A1 | * | 11/2008 | Ikeyama ................. 343/700 MS |
| 2009/0263711 | A1 | * | 10/2009 | Kim et al. ....................... 429/164 |

FOREIGN PATENT DOCUMENTS

| | | |
|---|---|---|
| CN | 101308952 | 11/2008 |
| JP | 10-163746 | 6/1998 |
| JP | 10-208717 | 8/1998 |
| JP | 11-135094 | 5/1999 |
| JP | 2007-187519 | 7/2007 |
| JP | 2008-171729 | 7/2008 |
| JP | 2009-002742 | 1/2009 |
| KR | 10-2004-0003019 | 1/2004 |

OTHER PUBLICATIONS

Office Action dated Jun. 12, 2012 from corresponding Japanese Patent Application No. 2010-165975 with English translation thereof.
Office Action mailed Aug. 1, 2012 in corresponding Korean Patent Application No. 10-2011-72716 with English translation.
Office Action issued Jun. 28, 2013 in corresponding Chinese patent application No. 201110216881.7 with English translation thereof.

\* cited by examiner

*Primary Examiner* — Ajibola Akinyemi
(74) *Attorney, Agent, or Firm* — Harness, Dickey & Pierce, PLC

(57) ABSTRACT

A portable transmitter includes a circuit board having a button battery and an antenna; and a case accommodating the battery and the circuit board. The case includes first and second case members being engaged with each other. A concave portion is formed on the first or second case members to accommodate the button battery, and a lock portion is formed on the first or second case members to lock the circuit board. While the concave portion accommodates the button battery and the circuit board is locked by the lock portion, a surface of the circuit board and a surface of the button battery are attached, and the first case member and the second case member are engaged.

5 Claims, 4 Drawing Sheets

FRONT SURFACE

BACK SURFACE

PORTABLE TRANSMITTER POWERED BY BUTTON BATTERY

CROSS REFERENCE TO RELATED APPLICATION

This application is based on and claims the benefit of priority from earlier Japanese Patent Application No. 2010-165975 filed on Jul. 23, 2010 the description of which is incorporated herein by reference.

TECHNICAL BACKGROUND

1. Field of the Invention

The present invention relates to a wireless communication unit, and more particularly to a portable transmitter that transmits electromagnetic waves via an antenna of the transmitter powered by a button type battery.

2. Description of the Related Art

Conventionally, a remote key-less system which opens and closes vehicle-doors and starts the engine of the vehicle is known. In the remote key-less system, electromagnetic waves are transmitted/received between user's transmitter device and an on-vehicle unit to verify whether or not the transmitter corresponds to the on-vehicle unit.

In such a remote key-less system, to shrink the size of the transmitter, for example, a Japanese Patent Application Laid-Open No. 2007-187519 discloses a watch having a structure accommodating a button type battery, an antenna laminated on a board together with the button type battery.

In the above-described structure, the transmitter supports the button type battery by using a battery frame that supports the battery. The board having the antenna and the battery frame are fixed to a watch-body by screws and the battery is inserted to the battery frame. Then, a cap portion of a back surface of the watch is fixed to the watch-body by the screws as well. Therefore, it is considered that a problem arises in the assembly step to manufacture this structure. Moreover, the battery frame needs to occupy a space in the structure. Hence, it is considered that downsizing cannot be performed easily.

SUMMARY

Taking the situation set forth above into consideration, an embodiment provides a portable transmitter, which is able to further shrink the size of the transmitter and to enhance easiness of the assembling thereof.

As a first aspect of the disclosure, a portable transmitter for transmitting radio waves includes a circuit board having a button battery that supplies power to the circuit board and an antenna that transmits the radio waves; and a case accommodating the button battery and the circuit board to be laminated, the case including a first case member and a second case member being engaged each other to form the case. In the portable transmitter, a concave portion is formed on either the first or second case members to accommodate the button battery, a lock portion is formed on either the first or second case members to lock the circuit board, and while the concave portion accommodates the button battery and the circuit board is locked by the lock portion, a surface of the circuit board and a surface of the button battery are attached, and the first case member and the second case member are engaged.

According to the configuration as described above, the concave portion formed in either the first case member or the second case member accommodates the button battery, a surface of the circuit board and a surface of the battery are attached while the circuit board is locked by the lock portion, and the first case member and the second case member are engaged whereby the assembling of the portable transmitter completes. As a result, the portable transmitter can be assembled efficiently and also, since the battery frame is not necessary in order to support the button battery, useless region by the battery frame does not appear in the device. Therefore, downsizing of the device can be made.

Considering a small size button-type-battery is used, the life of the battery decreases. Hence, to expand the life of the battery, a large size battery is necessary, however, the larger the size of the battery, the larger the size of the case itself. Moreover, the distance between the battery and the antenna becomes shorter where the propagation of the radio waves is blocked by the button-type-battery so that the characteristics of the propagating the radio waves is degraded.

As a second aspect of the disclosure, an embodiment provides the portable transmitter in which the circuit board has a circular shape of which diameter is larger than a diameter of the battery and the antenna is disposed on an area of the circuit board, the area corresponding to an outer region of an outer peripheral of the battery.

According to this configuration, the antenna is disposed on a region outside the outer peripheral of the battery 12 so that degrading the characteristics of propagating the radio waves can be suppressed.

As a third aspect of disclosure, an embodiment provides the portable transmitter in which the battery is arranged to have eccentricity such that a center location of the battery and a center location of the circuit board are different from each other, the circuit board includes an area not duplicating the shape of the battery in a direction where the battery and the circuit board 15 are laminated, the area is being widened and the antenna is arranged on the widened area.

According to the configuration as described above, the button battery is arranged to have eccentricity such that the center location of the battery and the center location of the circuit board are different from each other. The area on the circuit board is widened to secure an area where the antennas are placed. The area used for the antennas is defined such that the area is not being duplicated with the shape of the battery (the area does not match the shape of the battery) in a direction where the battery and the circuit board are laminated. Therefore, the distance between the antenna and the battery becomes longer than the distance when the center location of the battery and the center location of the circuit board are arranged at the same location so that degradation of the characteristics of the propagating the radio waves can be avoided.

As a fourth aspect of the disclosure, an embodiment provides the portable transmitter in which the antenna is configured by two single axis antennas perpendicularly arranged from each other. Moreover, as a fifth aspect of the disclosure, the antenna can be configured by a pattern-antenna formed by a wiring pattern on the circuit board.

As a sixth aspect of the disclosure, an embodiment provides the portable transmitter in which the circuit board includes a surface having two single axis antennas perpendicularly arranged from each other and the other surface having the pattern antenna formed by a wiring pattern.

As a seventh aspect of the disclosure, an embodiment provides the portable transmitter in which the shape of the case is circular when viewing from a direction where the battery and the circuit board are laminated.

According to the configuration as described above, the shape of the case is circular when viewing from a direction where the button battery and the circuit board are laminated. Hence, unnecessary space usage can be reduced so that the capacity of the case can be minimized.

It is noted that the reference numbers used in parenthesis of this section correspond to elements in the embodiment section which is described later.

DETAILED DESCRIPTION OF THE PREFERRED EMBODIMENTS (First Embodiment)

Figure 1:
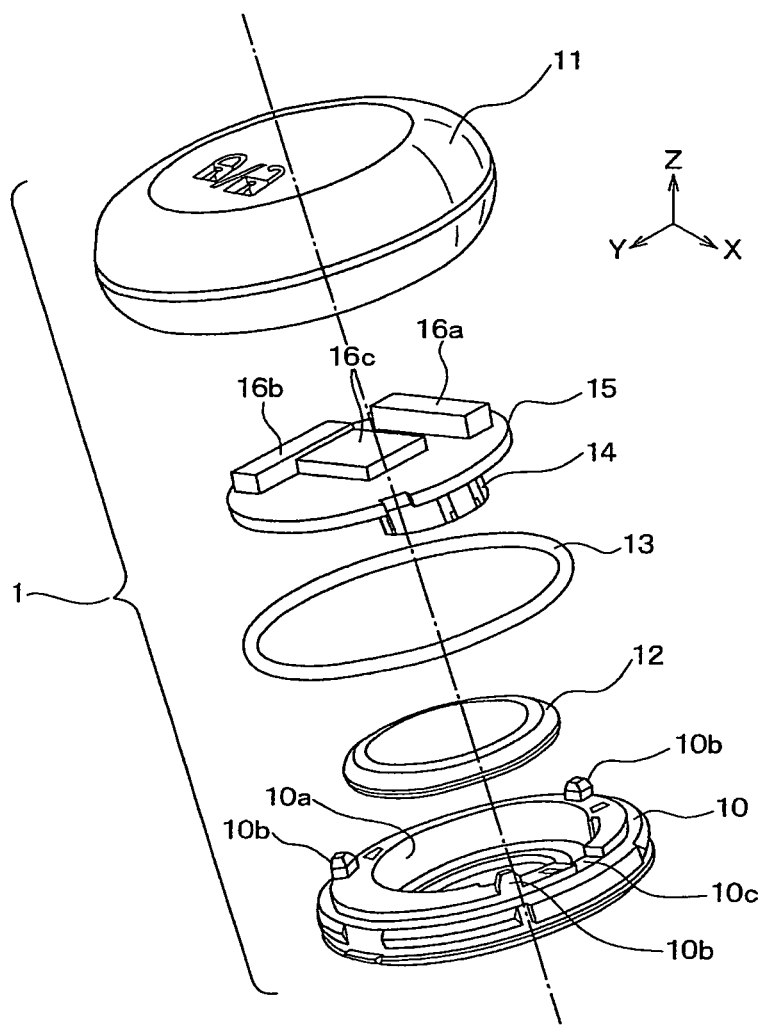
FIG. 1 is an explanatory diagram showing an overall configuration of a portable transmitter according to the first embodiment of the present invention.

FIG. 1 is an overall configuration of the portable transmitter according to the first embodiment. The portable transmitter 1 is used for a smart entry system performing opening and closing of the vehicle doors, and starting the engine of the vehicle. The smart entry system is configured to transmit/receive radio waves between the portable transmitter and an on-vehicle equipment (not shown) so as to verify information from the portable transmitter 1.

The portable transmitter 1 includes a first case member 10, a second case member 11, a button type battery 12 (referred to a battery), an o-ring 13, a terminal 14 and a circuit board 15. In FIG. 1, it is noted that the portable transmitter 1 before assembly is shown. As shown in FIG. 1, Z-axis and a dashed-line indicate a direction in which the above-described parts of the transmitter 1, i.e., case members 10 and 11, the battery 12, o-ring 13, and the circuit board 15 are assembled (laminated).

The first and second case members 10 and 11 are made of resin. The first case member 10 and the second case member are engaged to form a case in which the button type battery 12, terminal 14 and the circuit board 15 are arranged to be laminated together.

The button type battery 12 has approximately cylindrical shape and includes positive and negative terminals. It is noted that the dimension of the button type battery varies depending on types of battery and its standard.

A concave portion 10a to accommodate the button type battery 12 is formed inside the first case member 10. Three lock portions 10b to lock the circuit board 15 are formed along a peripheral edge of the concave portion 10a.

In the first case member 10, a notch portion 10c is formed. The notch portion 10c is used for a plate member to be inserted. The plate member is inserted to the notch portion 10c to separate the first case member and the second case member when the battery is replaced.

The terminal 14 is used to electrically connect respective terminals (positive and negative terminals) of the battery and an electrode formed on the back surface of the circuit board 15. The terminal 14 according to the embodiment is fixed to the electrode which is formed in advance on the back surface of the circuit board 15 with soldering.

The o-ring 13 is used to secure air tightness at a portion where the first case member 10 and the second case member 11 are engaged. The o-ring 13 is made of an elastic rubber or a resin and arranged between a step formed at the first case member 10 and a step formed at the second case member 11.

The circuit board 15 has a circular shape and notch portions are formed on portions corresponding to the three lock portions 10b formed on the first case member 10. The back surface of the circuit board 15 and a surface of the battery are attached via the terminal 14 while the notch portions of the circuit board 15 are locked by the lock portions 10b of the circuit board 15.

On the surface of the circuit board 15, two single axis antennas 16a, 16b and a circuit element such as control circuit 16c are formed. Moreover, a pattern-antenna 17 (described later) which is configured by a wiring pattern is formed on the back surface of the circuit board 15.

The single axis antenna 16a and 16b are used for transmitting and receiving radio waves in short distance, and the pattern-antenna 17 is used for radio waves to be transmitted in long distance. The single axis antenna 16a and 16b are adapted for transmitting radio waves of which frequency range is LF (low frequency) and the transmitting frequency range applied to the pattern-antenna 17 is RF (radio frequency).

The single axis antennas 16a and 16b are mounted on the circuit board 15 to be mutually crossed at the right angle. Since a two axis antenna applied for two axis (i.e., x axis, y axis) requires large chip size, in the embodiment, two single axis antennas 16a and 16b are arranged to be mutually crossed at the right angle to constitute the two axis antenna.

Figure 2:
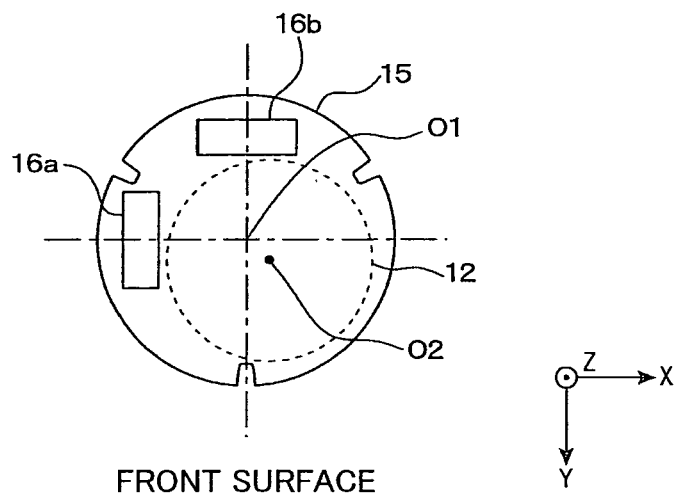
FIG. 2 is an explanatory diagram showing an arrangement of two single axis antennas mounted on a surface of a circuit board.
Figure 3:
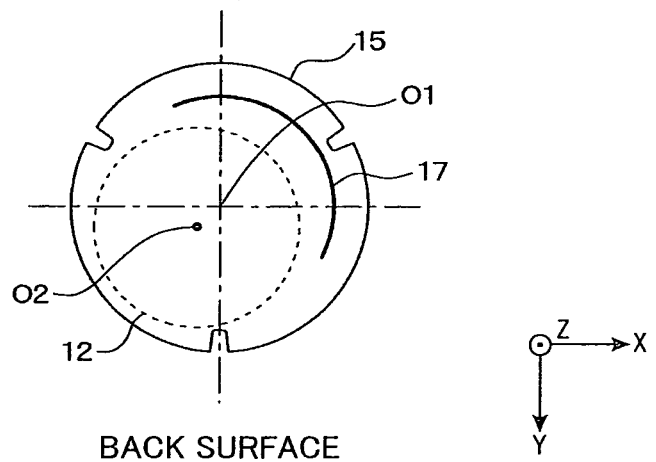
FIG. 3 is an explanatory diagram showing an arrangement of a pattern-antenna formed on the back surface of the circuit board.

FIG. 2 shows an arrangement of the single axis antennas 16a and 16b which are mounted on the surface of the circuit board 15. FIG. 3 shows an arrangement of the pattern-antenna 17 which are formed on the back surface of the circuit board 15. It is noted that a shape of the battery 12 is shown in FIGS. 2 and 3 with a dotted line.

The portable transmitter 1 according to the embodiment, to widen an area which does not match the shape of the battery 12, that is, to widen an area on the circuit board 15 which does not duplicate the shape of the battery 12 in a direction where the battery 12 and the circuit board 15 are laminated, the battery 12 is arranged to have eccentricity such that the center location o2 of the battery 12 and the center location o1 of the circuit board 15 are different from each other.

The respective antennas 16a, 16b and 17 are disposed on the widened region (left top region of FIG. 2). It is determined that arranging component (such as antennas) on the widened area does not mean only arranging on the widened area but also arranging on an area including the widened area. According to the embodiment, the respective antennas 16a, 16b and 17 are arranged within the widened region.

The button type battery 12 is covered by a metallic cover so that if the battery 12 is disposed closely to the antenna, the radio waves are blocked by the battery 12 thereby degrading the directivity of the radio waves. When attempting to shrink the portable transmitter, it is necessary to arrange the battery 12 closely to the antenna so that the radio waves are blocked and the directivity is decreased. However, according to the embodiment as described above, the center location o2 of the battery 12 and the center location o1 of the circuit board 15 are located differently from each other, and the area on the circuit board 15 which does not duplicate the shape of the battery (when viewed from Z-axis as shown in FIGS. 1, 2 and 3) is widened in the plane of the battery 12 and the circuit board 15, and the respective antennas 16a, 16b and 17 are arranged on the area widened on the circuit board 15. As a result, appropriate distance is secured between the battery 12 and the respective antennas 16a, 16b, 17 so that both shrinking of the shape of the case and the enhanced directivity of the transmission radio waves can be achieved.

The control circuit 16c is configured as a microprocessor that includes a memory, and various processing is executed based on a program stored in the memory.

Figure 4:
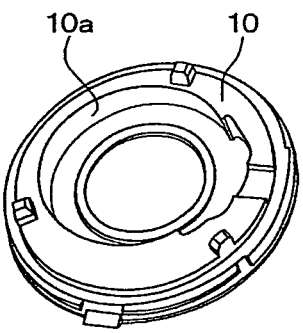
FIG. 4 is an explanatory diagram showing an assembly of the portable transmitter.
Figure 5:
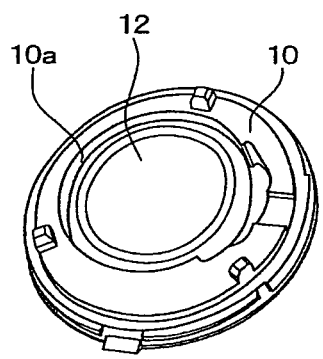
FIG. 5 is an explanatory diagram showing an assembly of the portable transmitter.

Next, with reference to FIGS. 4 to 7, hereinafter is described assembly of the portable transmitter 1. As shown in FIG. 4, first case member 10 is prepared, and as shown in FIG. 5, the battery 12 is inserted into a concave portion 10a formed in the first case member 10.

Figure 6:
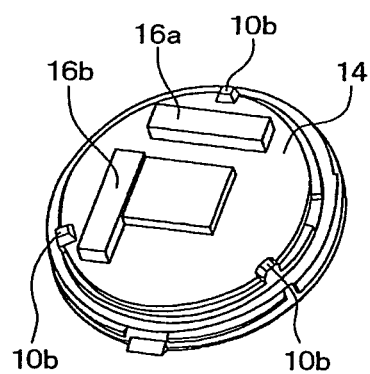
FIG. 6 is an explanatory diagram showing an assembly of the portable transmitter.

Subsequently, as shown in FIG. 6, the circuit board 15 is disposed above the button type battery 12 so as to ensure the connection between the terminal 14 fixed to the back surface of the circuit board 15 and the button type battery 12, and then the circuit board 15 is locked by the lock portions 10b. Thus, the circuit board 15 is locked by the lock portion 10b so that the circuit board 15 is fixed to the first case member 10 and the back surface of the circuit board 15 and an upper surface of the battery 12 is attached to each other.

Figure 7:
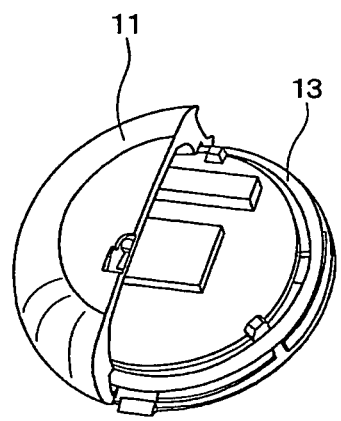
FIG. 7 is an explanatory diagram showing an assembly of the portable transmitter.

As shown in FIG. 7, after the o-ring 13 is placed on the step formed at the first case member 10, the first case member 10 and the second case member 11 are engaged to complete the assembly. In FIG. 7, a part of case member 11 is illustrated and the remaining part is omitted.

According to the above-described configuration, the concave portion 10a formed in the first case member 10 accommodates the button type battery 12, a surface of the circuit board 15 and a surface of the battery 12 are attached while the circuit board is locked by the lock portion 10b, and the first case member 10 and the second case member 11 are engaged whereby the assembling of the portable transmitter 1 completes. As a result, the portable transmitter can be assembled efficiently and also, since the battery frame is not necessary in order to support the button type battery, useless region by the battery frame does not appear in the device. Therefore, downsizing of the device can be performed.

Considering a small button-type-battery is used, the life of the battery is relatively short. Hence, to expand the life of the battery, a large size battery is necessary, however, the larger the size of the battery, the larger the size of the case itself. Moreover, distance between the battery and the antenna becomes shorter where the propagation of the radio waves is blocked by the button-type-battery so that the characteristics of propagating the radio waves is degraded.

According to the above-described configuration, the button type battery 12 is arranged to be offset such that the center location of the battery 12 and the center location of the circuit board 15 are different from each other. The area on the circuit board 15 is widened to secure an area where the antennas 16a, 16b and 17 are placed. The area used for the antennas is defined such that the area does not duplicate the shape of the battery in a direction where the battery 12 and the circuit board 15 are laminated. Therefore, the distance between the antenna and the battery become longer than the distance when the center location of the battery 12 and the center location of the circuit board 15 are arranged at the same location so that degradation of the characteristics of propagating the radio waves can be avoided.

According to the embodiment, respective antennas 16a, 16b and 17 are disposed in the widened area, that is, the area not duplicating the shape of the battery 12. However, even if the widened area expands to the area being duplicated with the shape of the battery, the respective antennas 16a, 16b and 17 can be placed in an area to include the widened area which is not duplicated with shape of the battery 12. As a result, the battery 12 does not block the radio waves being transmitted whereby degrading the directivity of the radio waves can be avoided.

(Second Embodiment)

Figure 8:
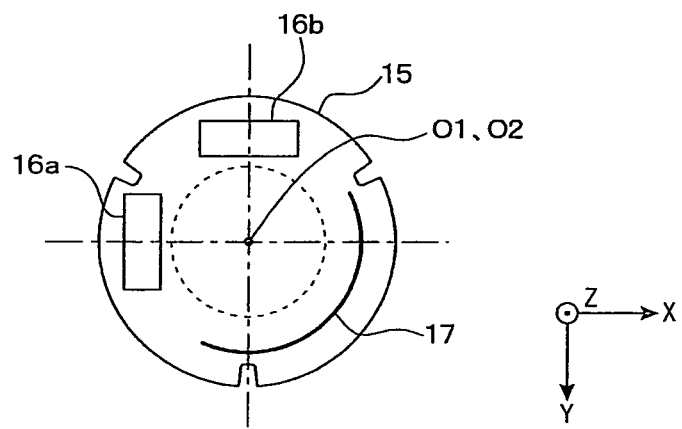
FIG. 8 is an explanatory diagram showing an arrangement of the single axis antenna and the pattern-antenna on the circuit board of the portable transmitter according to the second embodiment.

FIG. 8 illustrates an arrangement of the single axis antennas 16a and 16b, and the pattern-antenna 17 disposed on the circuit board 15 of the portable transmitter 1 according to the embodiment. It is noted that the location of the battery 12 is shown with a dotted line in FIG. 8. Hereinafter is mainly described the portion which differs from the first embodiment. It is noted that the portions identical to the one of the first embodiment are applied with the same reference numbers and the explanation thereof is omitted.

As shown in FIG. 8, according to the second embodiment, the single axis antenna 16a, 16b and the pattern-antenna 17 are arranged on the surface of the circuit board 15 such that the antennas 16a, 16b and 17 are disposed on a region outside the outer peripheral of the battery 12 (i.e., outer region). According to the second embodiment, the button type battery 12 is arranged such that the center location o2 of the battery 12 and the center location of the circuit board 15 become the same location.

Thus, the respective antennas 16a, 16b and 17 are arranged on a surface of the circuit board 15 i.e., a surface (front surface) opposite to the surface (back surface) facing to the battery 12 and on the outer region of the outer periphery of the battery 12, whereby the distance between the battery and the respective antennas 16a, 16b and 17 can be secured. As a result, the shape of the case can be shrunk and the directivity of the radio waves can be enhanced as well.

(Other Embodiment)

According to the above-described first and second embodiments, a configuration in which the concave portion 10a is formed inside the first case member 10 to accommodate the battery 12 and the lock portions 10b are formed to lock the circuit board 15 is exemplified. However, it is not limited to this configuration and various modifications can be made. For instance, the second case member 11 may include a concave portion to accommodate the battery 12 and the lock portions 10b to lock the circuit board 15. Moreover, the concave portion 10a can be formed on the first case member 10 and the lock portions 10b can be formed on the second case member 11 to lock the circuit board 15 as well.

In the above-described embodiment, the circuit board 15 is locked by the lock portions 10b so that the circuit board 15 is fixed to the first case member 10 whereby the back surface of the circuit board 15 and the upper surface of the button type battery 12 are attached each other. However, the following configuration can be employed. For instance, the circuit board 15 is locked by the lock portions 10b and then, the first case member 10 and the second case member 11 are engaged to fix the circuit board 15 to the first case member 10 so that the back surface of the circuit board 15 and the upper surface of the battery are attached each other.

Moreover, according to the above-described first and second embodiments, the terminal 14 is fixed in advance to the electrode formed on the back surface of the circuit board by soldering. However, it is not limited to this configuration. For instance, the terminal 14 can be disposed in the case when the circuit board 15 is assembled.

According to the first and second embodiments, the circuit board 15 has a circular shape. However, the shape is not limited to the circular. Regarding the button type battery according to the first and second embodiment, the shape of the case is circular when viewing from a direction where the battery 12 and the circuit board 15 are laminated. However, the shape of the case is not limited to the circular shape. For instance, another shape such as square, ellipse can be adapted for the shape of the case.

In configurations according to the first and second embodiments, the single axis antenna 16a, 16b and the pattern-antenna 17 are disposed on the circuit board 5. However, it is not necessary to dispose all the antennas to the circuit board 15. Alternatively, antennas other than above-described antennas 16a, 16b, 17 may be disposed on the circuit board 15. Further, a two axis antenna configured as a single chip or a three axis antenna configured as a single chip may be arranged on the circuit board 15.

According to the first embodiment, the single axis antenna 16a, 16b and the pattern-antenna 17 are disposed on an outer region of the outer peripheral of the button type battery 12. In the second embodiment, the center location of the battery 12 and the center location of the circuit board 15 are arranged to be different from each other to have eccentricity so as to widen the area formed on the circuit board 15 being not duplicated with the shape of the battery in the direction where the battery 12 and the circuit board are laminated. The respective antennas 16a, 16b and 17 are disposed on the widened area. However, the arrangement of the respective antennas is not limited to the one of the above-described embodiments.

What is claimed is:

1. A portable transmitter for transmitting radio waves comprising:
    a circuit board having a battery that supplies power to the circuit board and an antenna that transmits the radio waves, the battery having a circular cylindrical shape and the circuit board having a circular shape, a diameter of the circuit board being larger than a diameter of the battery, the antenna including two single axis antennas perpendicularly arranged from each other or a pattern-antenna formed by a wiring pattern, the antenna is disposed on an area of the circular circuit board, the area corresponds to an outer region of an outer periphery of the battery; and
    a case accommodating the battery and the circuit board to be laminated, the case comprising a first case member and a second case member being engaged with each other to form the case, wherein a concave portion is formed on either the first or second case members to accommodate the battery, a lock portion is formed on either the first or second case members to lock the circuit board with either the first case member or the second case member, and while the concave portion accommodates the battery and the circuit board is locked by the lock portion, a surface of the circuit board and a surface of the battery are attached, and the first case member and the second case member are engaged, wherein the battery is arranged to have eccentricity such that a circular center of the battery and a circular center of the circuit board are different from each other, the circuit board includes an area not duplicating with a shape of the battery in a direction where the battery and the circuit board are laminated, the area is being widened, and the antenna is arranged on the widened area.

2. The portable transmitter according to claim 1, wherein the circuit board includes a surface having two single axis antennas perpendicularly arranged from each other and the other surface having a pattern antenna formed by a wiring pattern.

3. The portable transmitter according to claim 1, wherein a shape of the case is circular when viewing from a direction where the battery and the circuit board are laminated.

4. The portable transmitter according to claim 1, wherein the circuit board includes a terminal fixed thereto and a notch portion to be engaged with the lock portion,
    the terminal electrically connects a terminal of the battery and an electrode formed on a surface of the circuit board, while the concave portion accommodates the battery and the circuit board is locked by the lock portion.

5. The portable transmitter according to claim 1, wherein the case is circular.

* * * * *